(12) United States Patent
Matsumura et al.

(10) Patent No.: US 12,021,781 B2
(45) Date of Patent: Jun. 25, 2024

(54) TERMINAL, RADIO COMMUNICATION METHOD, AND SYSTEM FOR CARRYING OUT DOWNLINK COMMUNICATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 335 days.

(21) Appl. No.: 17/610,818

(22) PCT Filed: May 13, 2019

(86) PCT No.: PCT/JP2019/018977
§ 371 (c)(1),
(2) Date: Nov. 12, 2021

(87) PCT Pub. No.: WO2020/230243
PCT Pub. Date: Nov. 19, 2020

(65) Prior Publication Data
US 2022/0209918 A1 Jun. 30, 2022

(51) Int. Cl.
*H04L 5/00* (2006.01)
(52) U.S. Cl.
CPC .......... *H04L 5/0051* (2013.01); *H04L 5/0053* (2013.01)
(58) Field of Classification Search
CPC ... H04L 5/0051; H04L 5/0053; H04L 5/0044; H04L 5/0094; H04B 7/024
See application file for complete search history.

(56) References Cited

U.S. PATENT DOCUMENTS

2016/0286558 A1* 9/2016 Chae ................... H04W 72/23
2019/0297637 A1* 9/2019 Liou ................ H04W 72/1273

OTHER PUBLICATIONS

ZTE, "Maintenance for Reference Signals and QCL"; 3GPP TSG RAN WG1 Meeting #94, R1-1808197; Gothenburg, Sweden; Aug. 20-24, 2018 (14 pages) (Year: 2018).*
International Search Report issued in PCT/JP2019/018977 on Dec. 10, 2019 (2 pages).
Written Opinion of the International Searching Authority issued in PCT/JP2019/018977 on Dec. 10, 2019 (4 pages).
LG Electronics; "Enhancements on multi-TRP/panel transmission"; 3GPP TSG RAN WG1 Meeting #97, R1-1906730; Reno, USA; May 13-17, 2019 (12 pages).

(Continued)

*Primary Examiner* — Ian N Moore
*Assistant Examiner* — Latresa A McCallum
(74) *Attorney, Agent, or Firm* — Osha Bergman Watanabe & Burton LLP

(57) ABSTRACT

A user terminal according to an aspect of the present disclosure includes: a receiving section that receives a downlink shared channel (Physical Downlink Shared Channel (PDSCH)), based on one piece of downlink control information; and a control section that determines a number of default Quasi-Co-Locations (QCLs) to be applied to the PDSCH, based on the downlink control information. According to an aspect of the present disclosure, DL communication can be preferably carried out even in a case where multiple panels/TRPs are used.

3 Claims, 11 Drawing Sheets

(56) References Cited

OTHER PUBLICATIONS

ZTE; "Enhancements on Multi-TRP and Multi-panel Transmission"; 3GPP TSG RAN WG1 #97, R1-1906236; Reno, USA; May 13-17, 2019 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

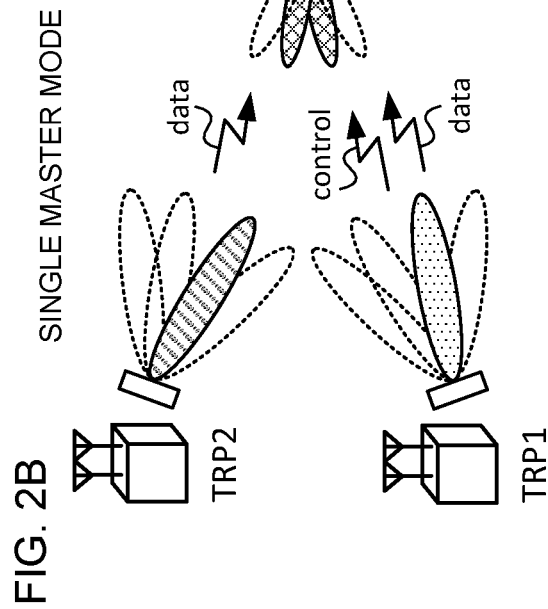
FIG. 2B SINGLE MASTER MODE
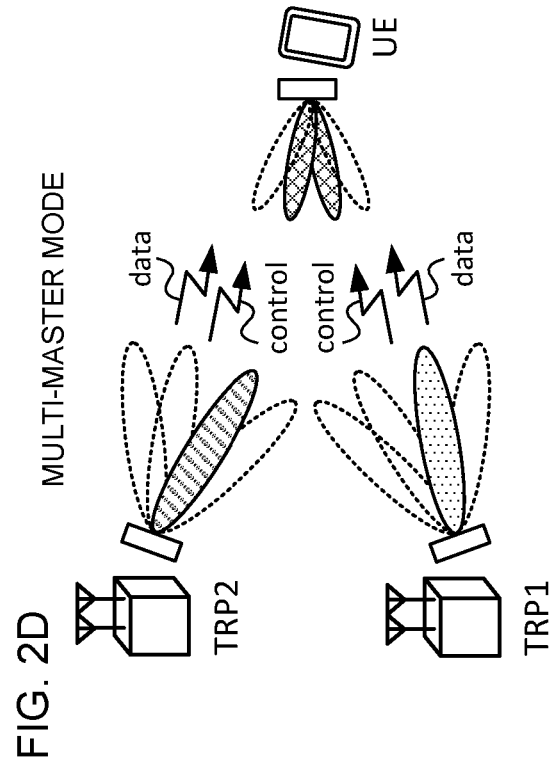
FIG. 2D MULTI-MASTER MODE
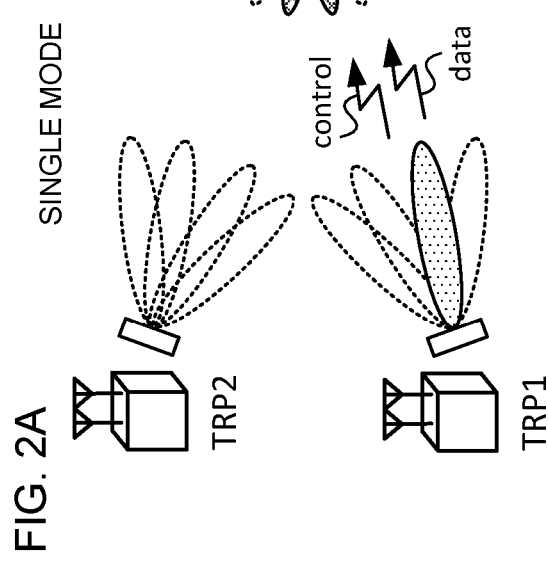
FIG. 2A SINGLE MODE
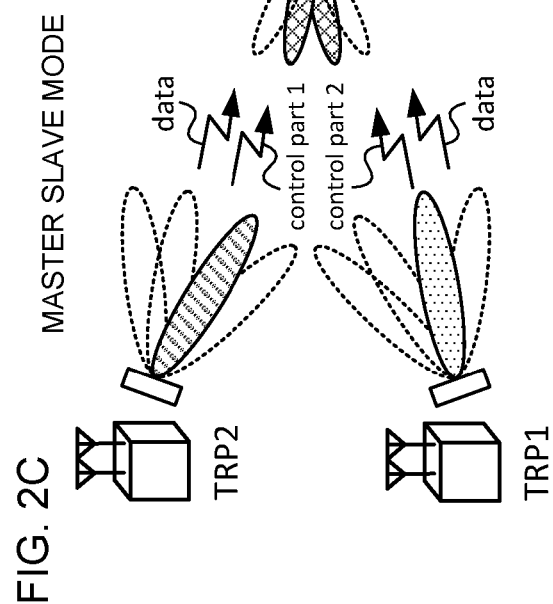
FIG. 2C MASTER SLAVE MODE

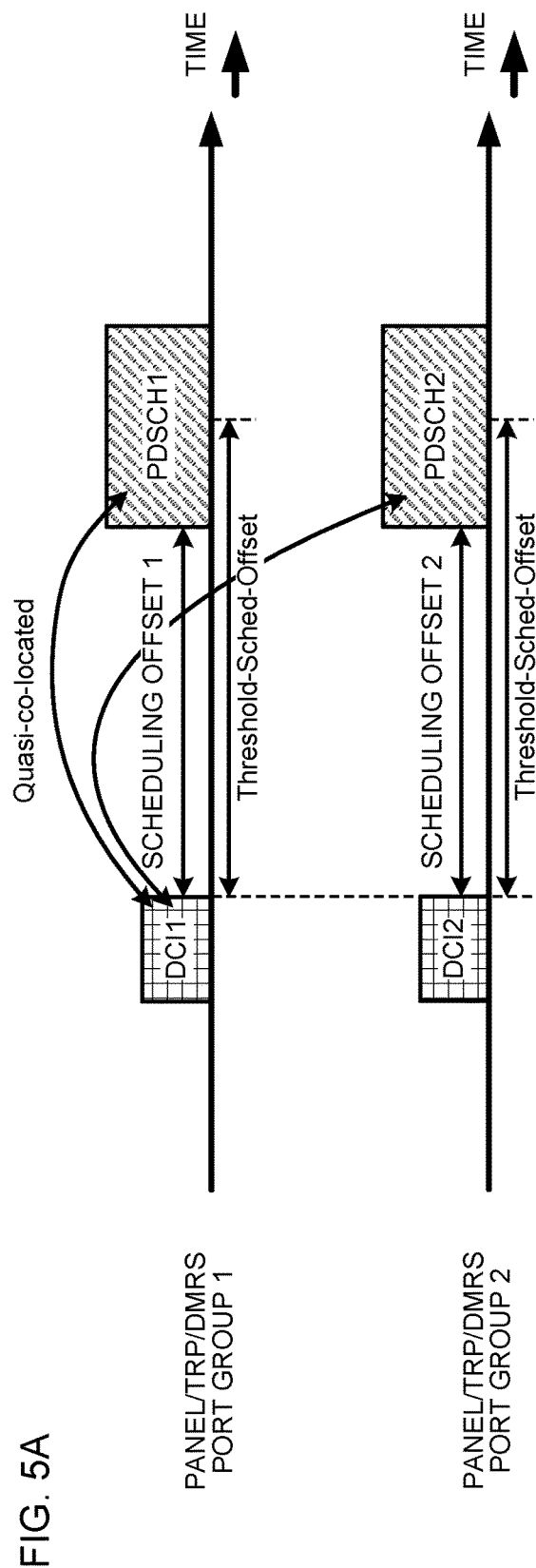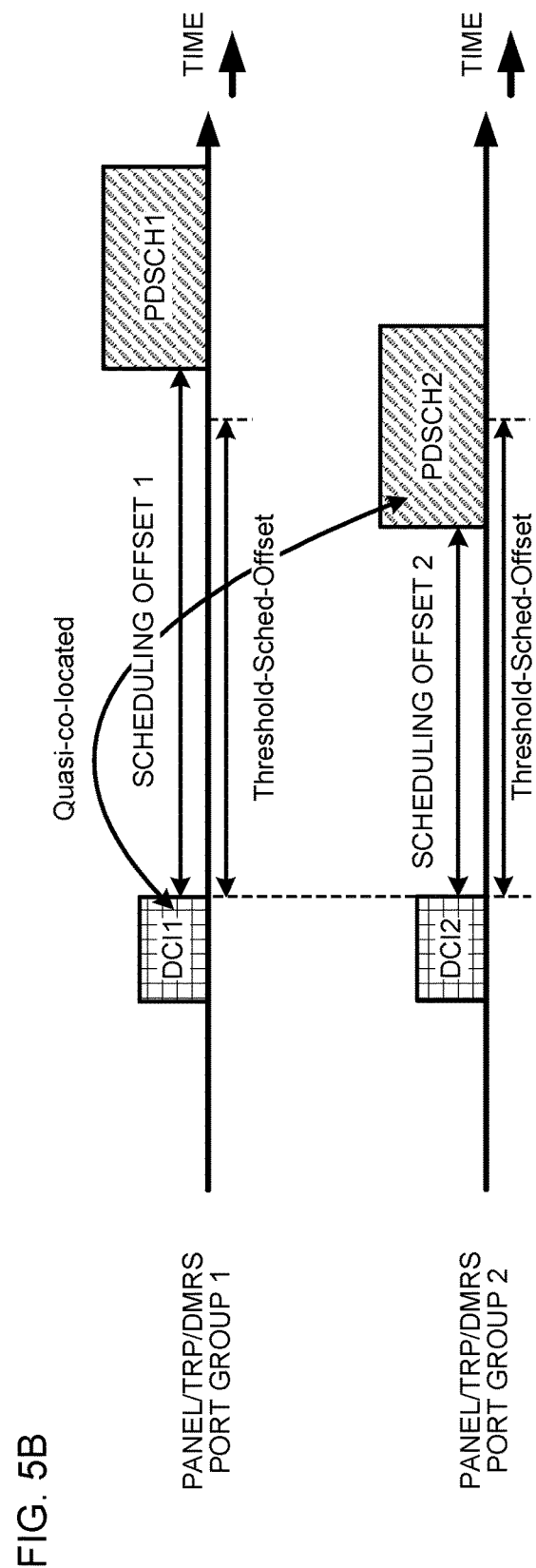

TERMINAL, RADIO COMMUNICATION METHOD, AND SYSTEM FOR CARRYING OUT DOWNLINK COMMUNICATION

TECHNICAL FIELD

The present disclosure relates to a user terminal and a radio communication method in next-generation mobile communication systems.

BACKGROUND ART

In a UMTS (Universal Mobile Telecommunications System) network, the specifications of LTE (Long-Term Evolution) have been drafted for the purpose of further increasing high speed data rates, providing lower latency and so on (see Non-Patent Literature 1). In addition, for the purpose of further high capacity, advancement and the like of the LTE (3GPP (Third Generation Partnership Project) Rel. (Release) 8 and Rel. 9), the specifications of LTE-Advanced (3GPP Rel. 10 to Rel. 14) have been drafted.

Successor systems of LTE (e.g., referred to as "5G (5th generation mobile communication system))," "5G+ (plus)," "NR (New Radio)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), the following scheme has been under study: based on information related to quasi-co-location (QCL) of at least one of a signal and a channel (referred to as a signal/channel), a user terminal (UE (User Equipment)) controls reception processing (for example, demapping, demodulation, decoding, reception beamforming, or the like) and transmission processing (for example, mapping, modulation, coding, precoding, transmit beamforming, or the like) for the signal/channel.

In NR, the following scheme has also been under study: one or a plurality of transmission/reception points (TRPs) (multiple TRPs) perform DL transmission (for example, PDSCH transmission) to the UE by using one or a plurality of panels (multiple panels).

However, in NR specifications defined so far, multiple panels/TRPs are not taken into consideration, and thus QCL assumption of a case in which multiple panels/TRPs are used cannot be appropriately controlled. Thus, in a case of conforming to the existing NR specifications, spatial diversity gain, high-rank transmission, and the like of a case in which multiple panels/TRPs are used cannot be implemented in a preferable manner, which may suppress increase of communication throughput.

In the light of this, the present disclosure has one object to provide a user terminal and a radio communication method that can preferably carry out DL communication even in a case where multiple panels/TRPs are used.

Solution to Problem

A user terminal according to an aspect of the present disclosure includes: a receiving section that receives a downlink shared channel (Physical Downlink Shared Channel (PDSCH)), based on one piece of downlink control information; and a control section that determines a number of default Quasi-Co-Locations (QCLs) to be applied to the PDSCH, based on the downlink control information.

Advantageous Effects of Invention

According to an aspect of the present disclosure, DL communication can be preferably carried out even in a case where multiple panels/TRPs are used.

BRIEF DESCRIPTION OF DRAWINGS

FIGS. 2A to 2D are each a diagram to show an example of a multi-TRP scenario;

FIGS. 5A and 5B are each a diagram to show an example of QCL assumption of the DMRS ports of the PDSCHs according to a modification of the first embodiment;

DESCRIPTION OF EMBODIMENTS (QCL/TCI)

Figure 1:
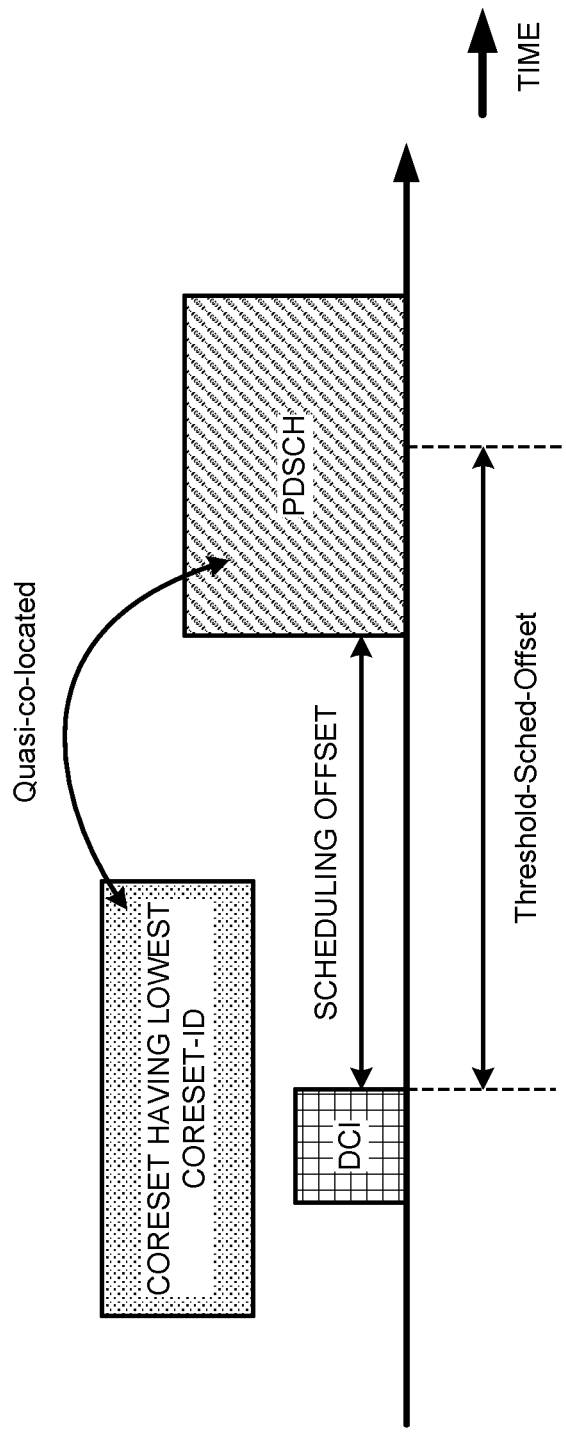
FIG. 1 is a diagram to show an example of QCL assumption of a DMRS port of a PDSCH.

For NR, control of reception processing (for example, at least one of reception, demapping, demodulation, and decoding) for at least one of a signal and a channel (referred to as a signal/channel) based on a transmission configuration indication state (TCI state) has been under study.

Here, the TCI state is information related to quasi-co-location (QCL) of a signal/channel, and may also referred to as a spatial reception parameter, spatial relation information (spatial relation info), or the like. The TCI state may be configured for the UE, for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (Spatial Rx Parameter)) is the same (the relationship of QCL is satisfied in at least one of these) between such a plurality of different signals/channels.

Note that the spatial reception parameter may correspond to a reception beam of the UE (for example, a receive analog beam), and the beam may be identified based on spatial QCL. The QCL (or at least one element of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) are described below:

QCL type A: Doppler shift, Doppler spread, average delay, and delay spread
QCL type B: Doppler shift and Doppler spread
QCL type C: Doppler shift and average delay
QCL type D: Spatial reception parameter A case where the UE assumes that a given CORESET, channel, or reference signal is in a relationship of specific QCL (for example, QCL type D) with another CORESET, channel, or reference signal may be referred to as QCL assumption.

The UE may determine at least one of a transmit beam (Tx beam) and a reception beam (Rx beam) of the signal/channel, based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of RRC (Radio Resource Control) signaling, MAC (Medium Access Control) signaling, broadcast information, and the like, or a combination of these.

For example, the MAC signaling may use MAC control elements (MAC CE), MAC PDUs (Protocol Data Units), and the like. The broadcast information may be, for example, a master information block (MIB), a system information block (SIB), minimum system information (RMSI (Remaining Minimum System Information)), other system information (OSI), or the like.

The physical layer signaling may be, for example, downlink control information (DCI).

A channel configured (specified) with the TCI state may be, for example, at least one of a downlink shared channel (PDSCH (Physical Downlink Shared Channel)), a downlink control channel (PDCCH (Physical Downlink Control Channel)), an uplink shared channel (PUSCH (Physical Uplink Shared Channel)), and an uplink control channel (PUCCH (Physical Uplink Control Channel)).

The RS having a QCL relationship with the channel may be, for example, at least one of a synchronization signal block (SSB), a channel state information reference signal (CSI-RS), and a reference signal for measurement (SRS (Sounding Reference Signal)).

The SSB is a signal block including at least one of a primary synchronization signal (PSS), a secondary synchronization signal (SSS), and a broadcast channel (PBCH (Physical Broadcast Channel)). The SSB may be referred to as an SS/PBCH block.

An information element ("TCI-state IE" of RRC) of the TCI state configured using higher layer signaling may include one or a plurality of pieces of QCL information ("QCL-Info"). The QCL information may include at least one of information (DL-RS relation information) related to the DL-RS to have a QCL relationship and information (QCL type information) indicating a QCL type. The DL-RS relation information may include information of an index (for example, an SSB index, or a non-zero power CSI-RS resource ID) of the DL-RS, an index of a cell in which the RS is located, an index of a BWP (Bandwidth Part) in which the RS is located, or the like.

<TCI State for PDCCH>

Information related to the QCL between the PDCCH (or a DMRS antenna port related to the PDCCH) and a given DL-RS may be referred to as a TCI state for the PDCCH or the like.

The UE may determine the TCI state for a UE-specific PDCCH (CORESET), based on higher layer signaling.

In the present disclosure, the higher layer signaling may be, for example, any one of RRC (Radio Resource Control) signaling, MAC (Medium Access Control) signaling, broadcast information, and the like, or a combination of these.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

For example, one or a plurality (K) of TCI states may be configured for the UE for each CORESET by using RRC signaling (ControlResourceSet information element). The UE may activate one or a plurality of TCI states for each CORESET by using the MAC CE. The MAC CE may be referred to as a TCI state indication MAC CE for a UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a given DL-RS may be referred to as a TCI state for the PDSCH or the like.

The UE may be notified of (configured with) M (M≥1) TCI states for the PDSCH (M pieces of QCL information for the PDSCH), by using higher layer signaling. Note that the number M of TCI states configured for the UE may be restricted by at least one of UE capability and the QCL type.

The downlink control information (DCI) used for scheduling of the PDSCH may include a given field (which may be referred to as, for example, a TCI field, a TCI state field, or the like) indicating the TCI state for the PDSCH. The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled with information notified from the base station to the UE. The information may be information (for example, TCI presence information, TCI presence information in DCI, higher layer parameter tci-PresentInDCI) indicating whether the TCI field is present or absent in the DCI. The information may be, for example, configured for the UE by using higher layer signaling.

When the DCI includes a TCI field of x bits (for example, x=3), the base station may configure, by using higher layer signaling, a maximum of $2^x$ (for example, 8 if x=3) types of TCI states for the UE in advance. The value of the TCI field (TCI field value) in the DCI may indicate one of the TCI states configured in advance using higher layer signaling.

When more than eight types of TCI states are configured for the UE, eight or less types of TCI states may be activated (or specified), by using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated using the MAC CE.

The MAC CE is used to specify a TCI state that maps a code point of the TCI field in the DCI out of TCI state IDs configured using RRC signaling and to activate the TCI state. The activated TCI state may be mapped from code point value 0 to $2^x-1$ (for example, 7 if x=3) of the TCI field in ascending order or descending order of the TCI state ID.

When a slot in which the UE transmits an HARQ-ACK (Hybrid Automatic Repeat reQuest ACKnowledgement) for the PDSCH for providing the MAC CE is represented by n, activation/deactivation (mapping between the TCI field in the DCI and the TCI state) based on the MAC CE may be applied from slot n+3*(number of slots in subframe)+1. In other words, in slot n+3*(number of slots in subframe)+1, update of the code point of the TCI field based on the MAC CE may be enabled.

When the TCI presence information is set "enabled," the TCI field in the DCI in a component carrier (CC) for scheduling (the PDSCH) indicates the TCI state activated in the scheduled CC or the DL BWP, and the PDSCH is scheduled using DCI format 1_1, the UE may use the TCI in accordance with the value of the TCI field in the PDCCH having the DCI and being detected in order to determine the QCL of the PDSCH antenna port.

When a time offset between reception of the DL DCI and reception of the PDSCH corresponding to the DCI is equal to or larger than a given threshold, the UE may assume that the RS in the TCI state related to a QCL type parameter given by the TCI state indicated by the DCI and the DMRS port of the PDSCH of a serving cell are quasi co-located ("the DM-RS ports of PDSCH of a serving cell are quasi co-located with the RS(s) in the TCI state with respect to the QCL type parameter(s) given by the indicated TCI state").

The time offset between reception of the DL DCI and reception of the PDSCH corresponding to the DCI may be referred to as a scheduling offset.

The threshold may be referred to as "Threshold," "Threshold for offset between a DCI indicating a TCI state and a PDSCH scheduled by the DCI," "Threshold-SchedOffset," "timeDurationForQCL," a schedule offset threshold, a scheduling offset threshold, a time length for QCL, or the like.

The scheduling offset threshold may be based on UE capability, or may be based on a delay caused in, for example, decoding of the PDCCH and beam switching. Information of the scheduling offset threshold may be configured from the base station using higher layer signaling, or may be transmitted from the UE to the base station.

When the scheduling offset is smaller than the scheduling offset threshold, the UE may assume that the RS in the TCI state related to a QCL parameter used for PDCCH QCL indication corresponding to the lowest CORESET-ID in the latest (most recent) slot in which one or more control resource sets (CORESETs) are configured for the UE in an active BWP (Bandwidth Part) of the serving cell and the DMRS port of the PDSCH of the serving cell are quasi co-located (the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE).

For example, the UE may assume that the DMRS port of the PDSCH is quasi co-located with the DL-RS based on the TCI state activated regarding the CORESET corresponding to the lowest CORESET-ID. The latest slot may be, for example, a slot in which the DCI for scheduling the PDSCH is received.

Note that CORESET-ID may be an ID (ID for identification of the CORESET) configured with an RRC information element "ControlResourceSet."

FIG. 1 is a diagram to show an example of QCL assumption of the DMRS port of the PDSCH. In the present example, the scheduling offset is smaller than the scheduling offset threshold. Thus, the UE may assume that the DMRS port of the PDSCH is quasi co-located with the RS (for example, the DMRS for the PDCCH) in the TCI state for the PDCCH corresponding to the lowest CORESET-ID in the latest slot.

When the UE is configured with a single-slot PDSCH, the indicated TCI state may be based on the TCI state activated in the slot having the scheduled PDSCH. When the UE is configured with a multiple-slot PDSCH, the indicated TCI state may be based on the TCI state activated in the first slot having the scheduled PDSCH, and the UE may expect that the indicated TCI state is the same over slots having the scheduled PDSCH.

When the UE is configured with the CORESET associated with a search space set for cross carrier scheduling, the UE is set with TCI presence information being "enabled" for the CORESET, and when at least one of the TCI states configured for the serving cell scheduled with the search space set includes QCL type D, the UE may assume that a time offset between the detected PDCCH and the PDSCH corresponding to the PDCCH is equal to or larger than a threshold.

(Multiple TRPs)

For NR, a scheme in which one or a plurality of transmission/reception points (TRPs) (multiple TRPs) perform DL transmission to the UE by using one or a plurality of panels (multiple panels) has been under study. A scheme in which the UE performs UL transmission to one or a plurality of TRPs has also been under study.

Note that the plurality of TRPs may correspond to the same cell identifier (ID), or may correspond to different cell IDs. The cell ID may be a physical cell ID, or may be a virtual cell ID.

FIGS. 2A to 2D are each a diagram to show an example of a multi-TRP scenario. In these examples, it is assumed that each TRP can transmit four different beams. However, this is not restrictive.

FIG. 2A shows an example of a case (which may be referred to as a single mode, a single TRP, or the like) in which only one TRP (in the present example, TRP 1) out of multiple TRPs performs transmission to the UE. In this case, TRP 1 transmits both of a control signal (PDCCH) and a data signal (PDSCH) to the UE.

FIG. 2B shows an example of a case (which may be referred to as a single master mode) in which only one TRP (in the present example, TRP 1) out of multiple TRPs transmits a control signal to the UE, and the multiple TRPs transmit a data signal thereto. The UE receives each PDSCH transmitted from the multiple TRPs, based on one piece of downlink control information (DCI).

FIG. 2C shows an example of a case (which may be referred to as a master slave mode) in which each of multiple TRPs transmits a part of a control signal to the UE, and the multiple TRPs transmit a data signal thereto. In TRP 1, part 1 of a control signal (DCI) may be transmitted, and in TRP 2, part 2 of the control signal (DCI) may be transmitted. Part 2 of the control signal may depend on part 1. The UE receives each PDSCH transmitted from the multiple TRPs, based on these parts of the DCI.

FIG. 2D shows an example of a case (which may be referred to as a multi-master mode) in which each of multiple TRPs transmits different control signals to the UE, and the multiple TRPs transmit a data signal thereto. In TRP 1, a first control signal (DCI) may be transmitted, and in TRP 2, a second control signal (DCI) may be transmitted. The UE receives each PDSCH transmitted from the multiple TRPs, based on these pieces of DCI.

When a plurality of PDSCHs (which may be referred to as multiple PDSCHs (multiple PDSCHs)) from multiple TRPs as shown in FIG. 2B are scheduled using one piece of DCI, the piece of DCI may be referred to as single DCI (single PDCCH). When a plurality of PDSCHs from multiple TRPs as shown in FIG. 2D are each scheduled using a plurality of pieces of DCI, the plurality of pieces of DCI may be referred to as multi-DCI (multiple PDCCHs).

From each TRP of multiple TRPs, codewords (Code Words (CWs)) and layers different from one another may be transmitted. As one mode of multi-TRP transmission, non-coherent joint transmission (NCJT) has been under study.

In NCJT, for example, TRP 1 applies modulation mapping and layer mapping on a first codeword to obtain a first number of layers (for example, two layers), and transmits a first PDSCH by using first precoding. TRP 2 applies modulation mapping and layer mapping on a second codeword to obtain a second number of layers (for example, two layers), and transmits a second PDSCH by using second precoding.

Note that it may be defined that a plurality of PDSCHs (multiple PDSCHs) to be transmitted using NCJT partially or entirely overlap regarding at least of the time and frequency domains. In other words, at least one of the time and frequency resources of the first PDSCH from the first TRP and the second PDSCH from the second TRP may overlap.

It may be assumed that the first PDSCH and the second PDSCH are not in a quasi-co-location (QCL) relationship (not quasi-co-located). Reception of multiple PDSCHs may be interpreted as simultaneous reception of PDSCHs that are not of QCL type D.

According to the multi-TRP scenario as described above, more flexible transmission control using a channel having satisfactory quality can be performed.

However, in NR specifications defined so far, multiple panels/TRPs are not taken into consideration, and thus QCL assumption of a case in which multiple panels/TRPs are used cannot be appropriately controlled.

Figure 3:
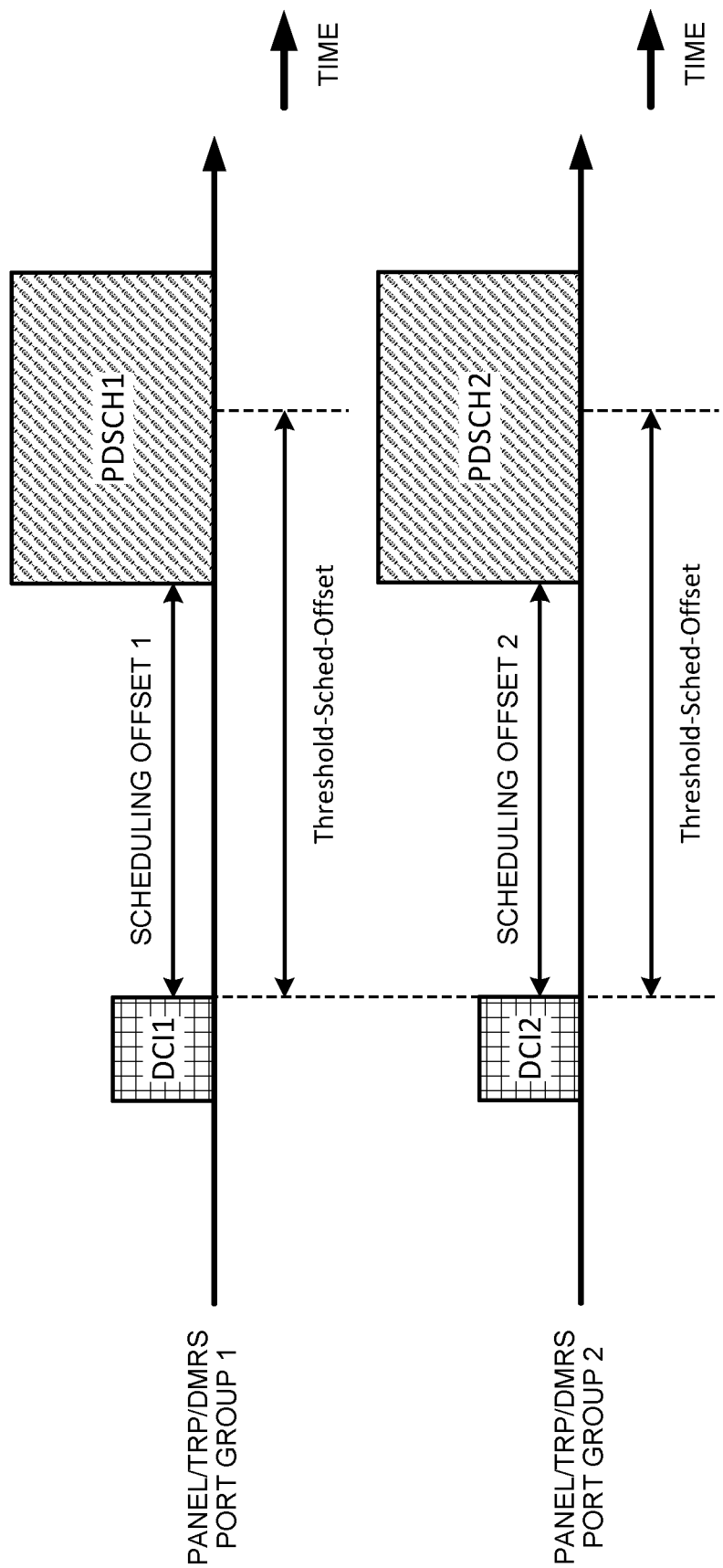
FIG. 3 is a diagram to show a problem of QCL assumption of the DMRS ports of the PDSCHs of a case in which multiple panels/TRPs are used.

FIG. 3 is a diagram to show a problem of QCL assumption of the DMRS ports of the PDSCHs of a case in which multiple panels/TRPs are used. The present example corresponds to the example of multiple PDCCHs shown in FIG. 2D.

The UE receives DCI 1 and PDSCH 1 transmitted from panel 1 (or TRP 1, or DMRS port group 1). Scheduling offset 1 from the reception of DCI 1 to PDSCH 1 is smaller than the scheduling offset threshold.

The UE receives DCI 2 and PDSCH 2 transmitted from panel 2 (or TRP 2, or DMRS port group 2). Scheduling offset 2 from the reception of DCI 2 to PDSCH 2 is smaller than the scheduling offset threshold.

In the example of FIG. 3, how QCL of PDSCH 1 and PDSCH 2 is assumed has not been studied so far. Thus, in a case of conforming to the existing NR specifications, spatial diversity gain, high-rank transmission, and the like of a case in which multiple panels/TRPs are used cannot be implemented in a preferable manner, which may suppress increase of communication throughput.

In the light of this, the inventors of the present invention came up with the idea of QCL assumption that can support a case in which multiple panels/TRPs are used.

Embodiments according to the present disclosure will be described below in detail with reference to the drawings. The radio communication methods according to respective embodiments may each be employed individually, or may be employed in combination.

Note that, in the present disclosure, a panel, an Uplink (UL) transmission entity, a TRP, a spatial relation, a control resource set (CORESET), a PDSCH, a codeword, a base station, a given antenna port (for example, a demodulation reference signal (DMRS) port), a given antenna port group (for example, a DMRS port group), a given group (for example, a code division multiplexing (CDM) group, a given reference signal group, or a CORESET group), and the like may be interchangeably interpreted. A panel Identifier (ID) and a panel may be interchangeably interpreted. A TRP ID and a TRP may be interchangeably interpreted.

In the present disclosure, NCJT, NCJT using multiple TRPs, multiple PDSCHs using NCJT, multiple PDSCHs, a plurality of PDSCHs from multiple TRPs, and the like may be interchangeably interpreted. Note that multiple PDSCHs may mean a plurality of PDSCHs whose at least part of time resources (for example, one symbol) overlaps, or may mean a plurality of PDSCHs whose entire time resources (for example, all of the symbols) overlap. In other words, the UE may receive multiple PDSCHs either at overlapping timing or simultaneously.

(Radio Communication Method)

First Embodiment

In a first embodiment, when the time offset (scheduling offset) between reception of the DL DCI and reception of the PDSCH corresponding to the DCI is smaller than the scheduling offset threshold, the UE may assume that the DMRS port of the PDSCH of the serving cell is quasi co-located with the RS in the TCI state related to the QCL parameter used for PDCCH QCL indication of the lowest CORESET-ID having a specific associated panel ID in the latest slot in which one or more CORESETs in the active BWP of the serving cell are configured for the UE.

Here, the specific associated panel ID may be, for example, a minimum or maximum panel ID in the latest slot in which one or more CORESETs in the active BWP of the serving cell are configured for the UE.

Figure 4A:
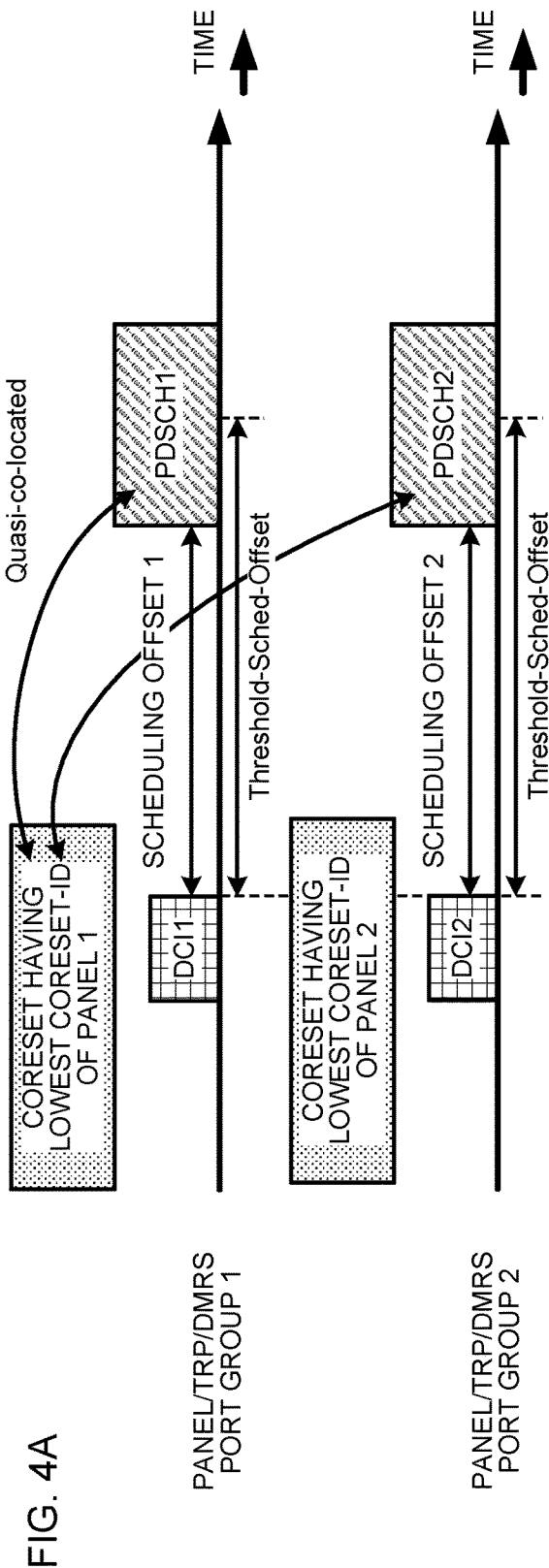
FIGS. 4A and 4B are each a diagram to show an example of QCL assumption of the DMRS ports of the PDSCHs according to a first embodiment.
Figure 4B:
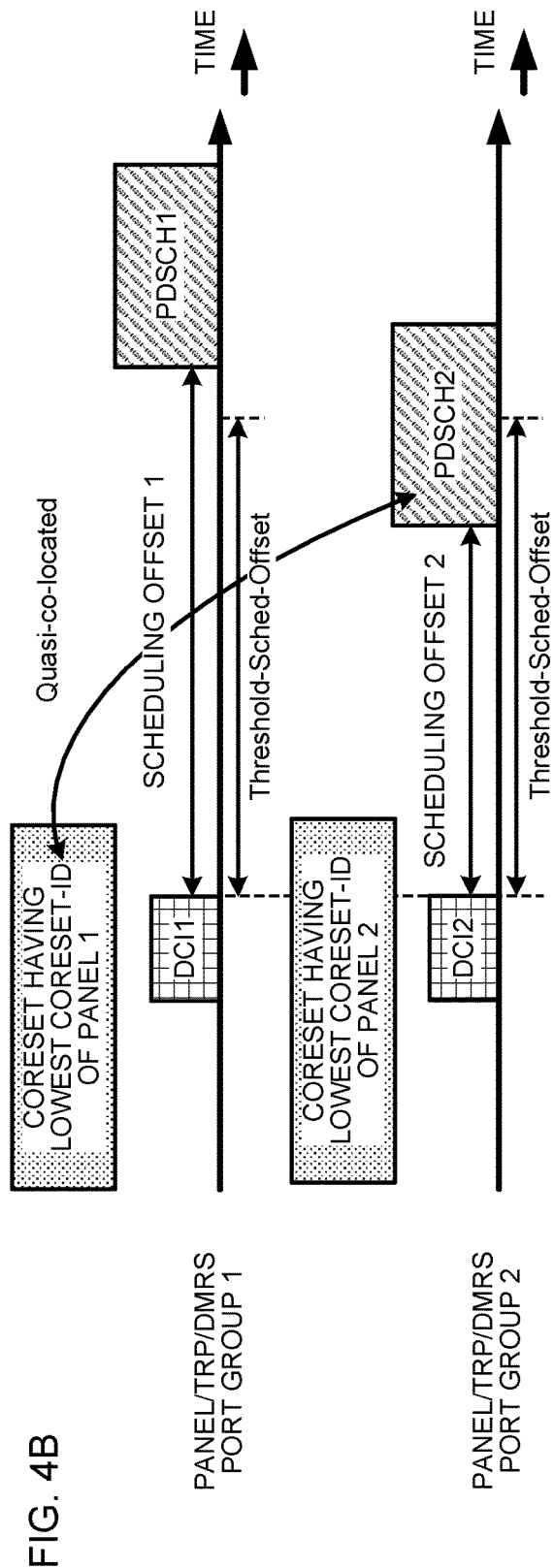

FIGS. 4A and 4B are each a diagram to show an example of QCL assumption of the DMRS ports of the PDSCHs according to the first embodiment. The example of FIG. 4A is the same as the example of FIG. 3. The example of FIG. 4B is different from FIG. 4A in that scheduling offset 1 is equal to or larger than the scheduling offset threshold. Note that, in these examples, it is assumed that the specific associated panel ID is panel ID1. However, this is not restrictive.

In FIG. 4A, both of scheduling offsets 1 and 2 are smaller than the scheduling offset threshold. Thus, the UE may assume that both of the DMRS port of PDSCH 1 and the DMRS port of PDSCH 2 are quasi co-located with the RS in the TCI state for the PDCCH corresponding to the lowest CORESET-ID of panel 1 in the latest slot.

Note that DCI 1 may be transmitted in a CORESET having the lowest CORESET-ID of panel 1, or may be transmitted in another CORESET (the same also applies to the subsequent figures; even if there are descriptions of CORESET and DCI, the DCI may or may not be included in the CORESET).

In FIG. 4B, scheduling offset 1 is larger than the scheduling offset threshold, and scheduling offset 2 is smaller than the scheduling offset threshold. Thus, the UE may assume that the DMRS port of PDSCH 1 is quasi co-located with the RS in the TCI state related to the QCL type parameter given by the TCI state indicated by DCI 1. The UE may assume that the DMRS port of PDSCH 2 is quasi co-located with the RS in the TCI state for the PDCCH corresponding to the lowest CORESET-ID of panel 1 in the latest slot.

Note that, as a modification of the first embodiment, when the scheduling offset is smaller than the scheduling offset threshold, the UE may assume that the DMRS port of the PDSCH of the serving cell is quasi co-located with the RS in the TCI state related to the QCL parameter used for the PDCCH for scheduling the PDSCH having a specific associated panel ID in the latest slot in which one or more CORESETs in the active BWP of the serving cell are configured for the UE.

FIGS. 5A and 5B are each a diagram to show an example of QCL assumption of the DMRS ports of the PDSCHs according to the modification of the first embodiment. FIGS. 5A and 5B are the same as FIGS. 4A and 4B, respectively, except for QCL assumption.

In FIG. 5A, both of scheduling offsets 1 and 2 are smaller than the scheduling offset threshold. Thus, the UE may assume that both of the DMRS port of PDSCH 1 and the DMRS port of PDSCH 2 are quasi co-located with the RS in the TCI state for the PDCCH corresponding to the DCI (in other words, DCI 1) for scheduling the PDSCH (in other words, PDSCH 1) of panel 1 in the latest slot.

In FIG. 5B, scheduling offset 1 is larger than the scheduling offset threshold, and scheduling offset 2 is smaller than the scheduling offset threshold. Thus, the UE may assume that the DMRS port of PDSCH 1 is quasi co-located with the RS in the TCI state related to the QCL type parameter given by the TCI state indicated by DCI 1. The UE may assume that the DMRS port of PDSCH 2 is quasi co-located with the RS in the TCI state for the PDCCH corresponding to the DCI (in other words, DCI 1) for scheduling the PDSCH (in other words, PDSCH 1) of panel 1 in the latest slot.

According to the first embodiment described above, QCL assumption related to the PDSCH of a case in which the scheduling offset is smaller than the scheduling offset threshold can be determined based on a specific panel. By reducing the scheduling offset to be smaller than the scheduling offset threshold, QCL assumption related to a plurality of PDSCHs can be arranged to be the same.

Second Embodiment

In a second embodiment, when the time offset (scheduling offset) between reception of the DL DCI and reception of the PDSCH corresponding to the DCI is smaller than the scheduling offset threshold, the UE may assume that the DMRS port of the PDSCH of the serving cell is quasi co-located with the RS in the TCI state related to the QCL parameter used for PDCCH QCL indication having the lowest CORESET-ID of a corresponding associated panel ID in the latest slot in which one or more CORESETs in the active BWP of the serving cell are configured for the UE.

Here, the corresponding associated panel ID may be, for example, a panel ID used for transmission or reception of the PDSCH (or the DCI).

Figure 6A:
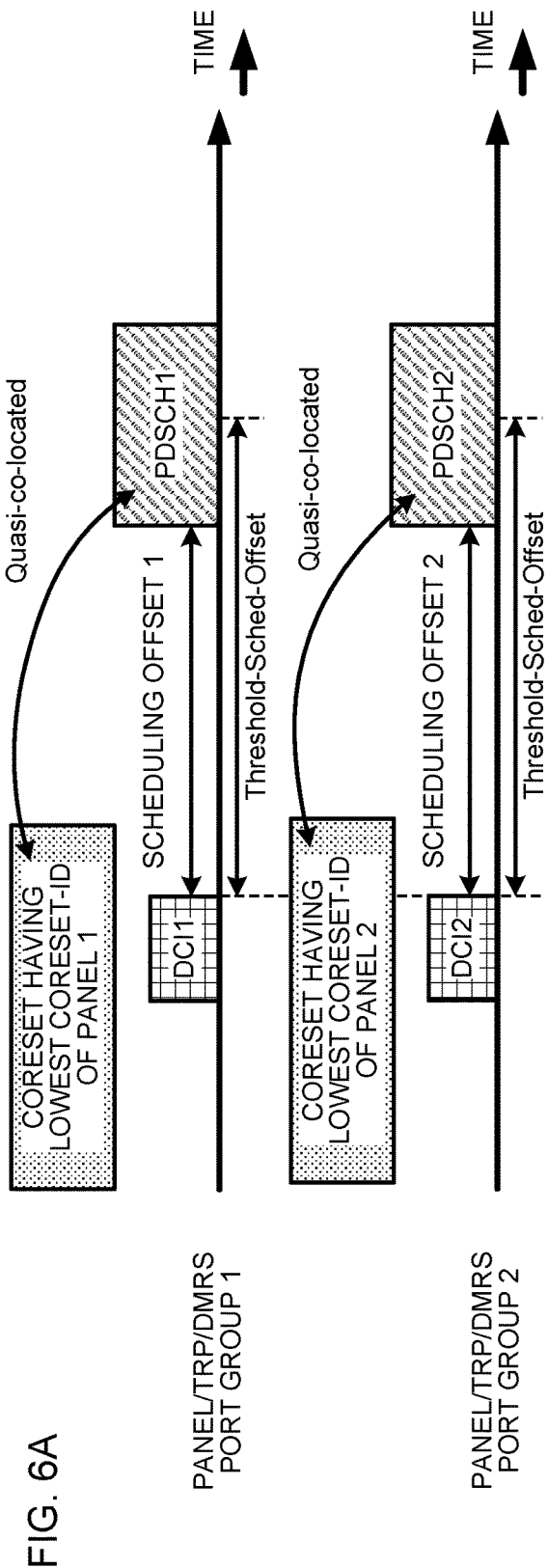
FIGS. 6A and 6B are each a diagram to show an example of QCL assumption of the DMRS ports of the PDSCHs according to a second embodiment.
Figure 6B:
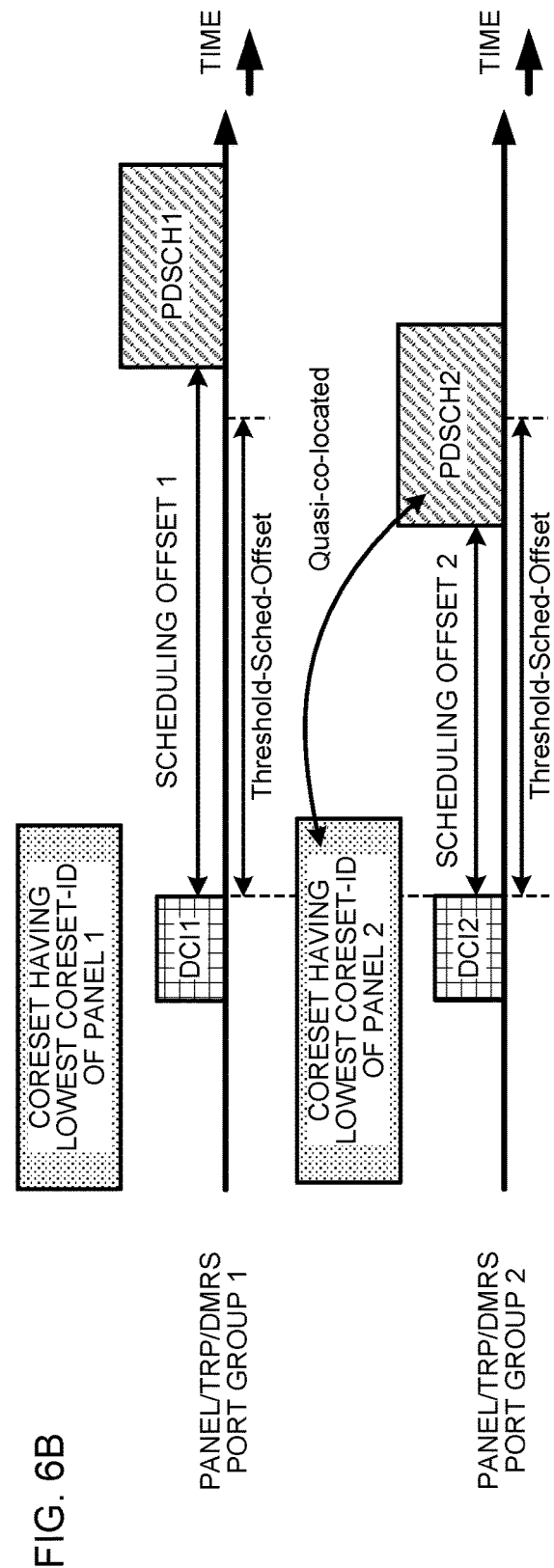

FIGS. 6A and 6B are each a diagram to show an example of QCL assumption of the DMRS ports of the PDSCHs according to the second embodiment. FIGS. 6A and 6B are the same as FIGS. 4A and 4B, respectively, except for QCL assumption.

In FIG. 6A, both of scheduling offsets 1 and 2 are smaller than the scheduling offset threshold. Thus, the UE may assume that the DMRS port of PDSCH 1 is quasi co-located with the RS in the TCI state for the PDCCH corresponding to the lowest CORESET-ID of panel 1 (panel for PDSCH 1) in the latest slot. The UE may assume that the DMRS port of PDSCH 2 is quasi co-located with the RS in the TCI state for the PDCCH corresponding to the lowest CORESET-ID of panel 2 (panel for PDSCH 2) in the latest slot.

In FIG. 6B, scheduling offset 1 is larger than the scheduling offset threshold, and scheduling offset 2 is smaller than the scheduling offset threshold. Thus, the UE may assume that the DMRS port of PDSCH 1 is quasi co-located with the RS in the TCI state related to the QCL type parameter given by the TCI state indicated by DCI 1. The UE may assume that the DMRS port of PDSCH 2 is quasi co-located with the RS in the TCI state for the PDCCH corresponding to the lowest CORESET-ID of panel 2 (panel for PDSCH 2) in the latest slot.

Note that, as a modification of the second embodiment, it may be assumed that the DMRS port of the PDSCH of the serving cell is quasi co-located with the RS in the TCI state related to the QCL parameter used for the PDCCH for scheduling the PDSCH having a corresponding associated panel ID in the latest slot in which one or more CORESETs in the active BWP of the serving cell are configured for the UE.

Figure 7A:
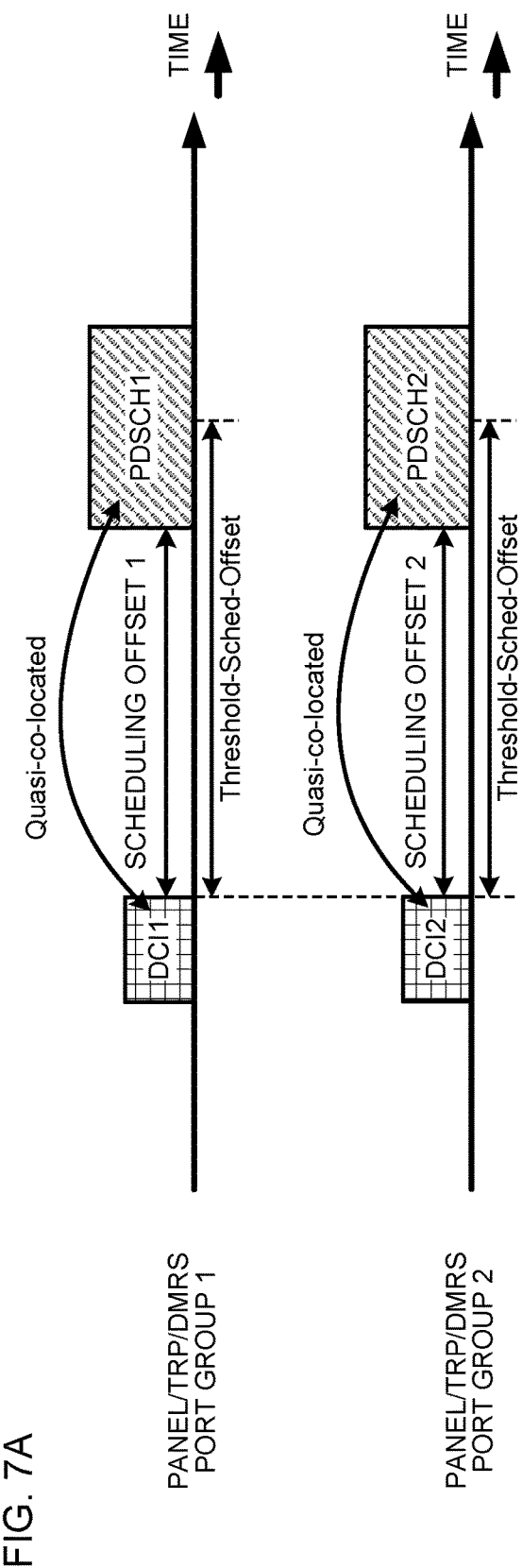
FIGS. 7A and 7B are each a diagram to show an example of QCL assumption of the DMRS ports of the PDSCHs according to a modification of the second embodiment.
Figure 7B:
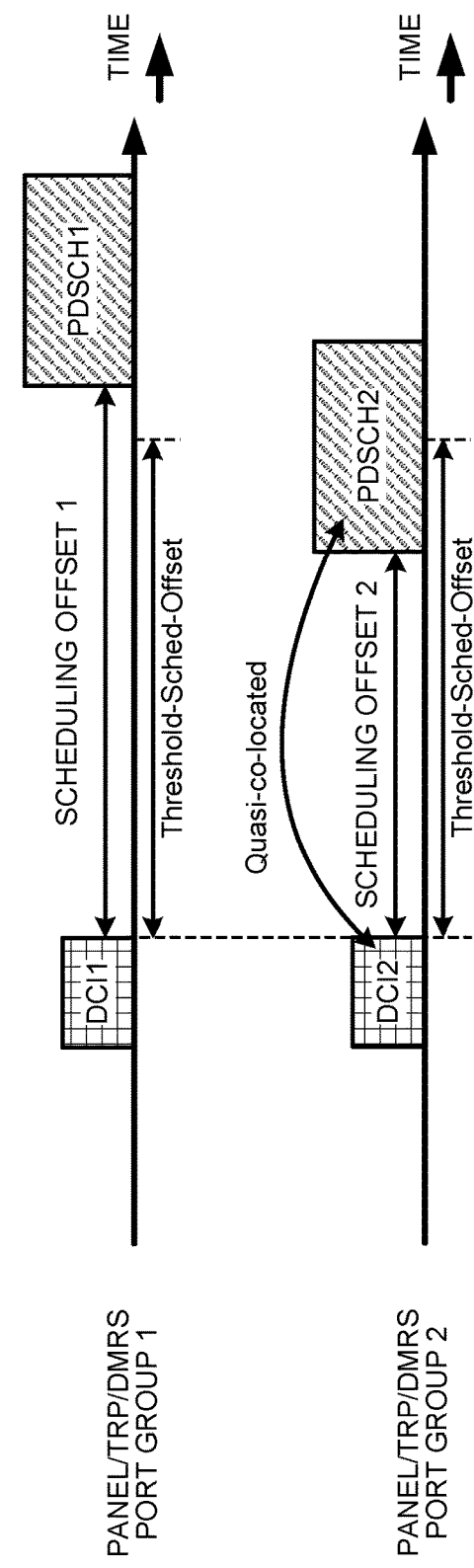

FIGS. 7A and 7B are each a diagram to show an example of QCL assumption of the DMRS ports of the PDSCHs according to the modification of the second embodiment. FIGS. 7A and 7B are the same as FIGS. 4A and 4B, respectively, except for QCL assumption.

In FIG. 7A, both of scheduling offsets 1 and 2 are smaller than the scheduling offset threshold. Thus, the UE may assume that the DMRS port of PDSCH 1 is quasi co-located with the RS in the TCI state for the PDCCH corresponding to the DCI (in other words, DCI 1) for scheduling the PDSCH (in other words, PDSCH 1) of panel 1 in the latest slot. The UE may assume that the DMRS port of PDSCH 2 is quasi co-located with the RS in the TCI state for the PDCCH corresponding to the DCI (in other words, DCI 2) for scheduling the PDSCH (in other words, PDSCH 2) of panel 2 in the latest slot.

In FIG. 7B, scheduling offset 1 is larger than the scheduling offset threshold, and scheduling offset 2 is smaller than the scheduling offset threshold. Thus, the UE may assume that the DMRS port of PDSCH 1 is quasi co-located with the RS in the TCI state related to the QCL type parameter given by the TCI state indicated by DCI 1. The UE may assume that the DMRS port of PDSCH 2 is quasi co-located with the RS in the TCI state for the PDCCH corresponding to the DCI (in other words, DCI 2) for scheduling the PDSCH (in other words, PDSCH 2) of panel 2 in the latest slot.

According to the second embodiment described above, QCL assumption related to the PDSCH of a case in which the scheduling offset is smaller than the scheduling offset threshold can be determined based on a corresponding panel.

OTHER EMBODIMENTS

The first embodiment may be, for example, applied to a case in which at least one of the following is satisfied:

Case in which the UE receives a plurality of PDCCHs (pieces of DCI) or PDSCHs from one TRP Case in which the UE receives a plurality of PDCCHs (pieces of DCI) or PDSCHs from multiple panels Case in which the TCI state of multiple TRPs or the DCI among multiple panels is assumed to be QCL type D The second embodiment may be, for example, applied to a case in which at least one of the following is satisfied:

Case in which the UE receives a plurality of PDCCHs (pieces of DCI) or PDSCHs from multiple TRPs Case in which the UE receives a plurality of PDCCHs (pieces of DCI) or PDSCHs from multiple panels Case in which the TCI state of multiple TRPs or the DCI among multiple panels is not assumed to be QCL type D Note that, among the above conditions, the TCI state of the DCI may be interpreted as at least one of an activated TCI state, a minimum TCI state ID, a TCI state of a lowest CORESET-ID, and the like.

Methods of determining QCL assumption illustrated in the first embodiment and the second embodiment may be separately used depending on a condition.

Although FIG. 4A to FIG. 7B show examples of multiple PDCCHs, each embodiment of the present disclosure may be applied to the single PDCCH. In this case, DCI 1 and DCI 2 may be interpreted as one identical piece of DCI.

For example, in FIG. 4A, when DCI 1 is not provided and DCI 2 is used to schedule PDSCH 1 and PDSCH 2, the UE may assume that both of the DMRS port of PDSCH 1 and the DMRS port of PDSCH 2 are quasi co-located with the RS in the TCI state for the PDCCH corresponding to the lowest CORESET-ID of panel 1 in the latest slot.

Note that, although each embodiment of the present disclosure shows an example in which reception timings of DCI 1 and DCI 2 are the same, this is not restrictive. Each embodiment of the present disclosure can also be applied to a case in which reception timings of pieces of DCI of respective panels are different from each other.

Note that scheduling offsets 1 and 2 illustrated in each embodiment of the present disclosure may be equal to each other or may be different from each other.

The above illustrates an example in which the scheduling offset threshold illustrated in each embodiment of the present disclosure is the same irrespective of a panel. However, the scheduling offset threshold may be different depending on a panel.

The method of assigning the index of CORESET-ID (indexing) may be the same (global) for the whole panels (or TRPs or DMRS port groups), or may be unique to each panel (or TRP or DMRS port group).

For example, the following example is considered: CORESET-ID=1 and 2 corresponds to DMRS port group 1, and CORESET-ID=3 and 4 corresponds to DMRS port group 2. In this case, the lowest CORESET-ID is 1. The lowest CORESET-ID of the minimum DMRS port group is 1. The lowest CORESET-ID of DMRS port group 1 is 1. The lowest CORESET-ID of DMRS port group 2 is 3.

Note that the DMRS port group may be associated for each CORESET (for example, the RRC information element "ControlResourceSet" may include information of the DMRS port group). Configuration information of the DMRS port group may include information of a corresponding CORESET. For example, information indicating that DMRS port group 1 corresponds to CORESET-ID=1 and 2 may be configured using the configuration information of the DMRS port group.

The DMRS port group according to the present disclosure may include at least one of the DMRS port group of the PDSCH, the DMRS port group of the PDCCH, the DMRS port group of the PBCH, and the DMRS port group of another channel.

The lowest CORESET-ID according to the present disclosure may be interpreted as a determined specific CORESET-ID.

YET OTHER EMBODIMENTS

The QCL (QCL assumption) applied to the PDSCH when the scheduling offset is smaller than the scheduling offset threshold as illustrated in the first embodiment and the second embodiment may be referred to as default QCL (default QCL assumption).

Note that definition of default QCL is not limited to the above. For example, the default QCL may be QCL assumed when a TCI state/QCL specified using DCI cannot be used, or may be QCL assumed when a TCI state/QCL is not specified (or configured), regarding a certain channel/signal (for example, a PDSCH).

Incidentally, in Rel-15, for the UE, the number of DMRS CDM groups without data (number of CDM group(s) without data), an antenna port index of the PDSCH (DMRS port(s)), and the like are specified based on an antenna port field included in the DCI (DL DCI).

The UE may refer to different tables, depending on values of a DMRS type (which may be configured with an RRC parameter "dmrs-Type") and a maximum length of the DMRS (which may be configured with an RRC parameter "maxLength") that are configured using higher layer signaling (for example, TS 38.212 Table 7.3.1.2.2-1/2/3/4). Depending on the values of the antenna port field, an entry of the table to be referred to (the entry corresponds to a set of the number of CDM groups, the antenna port index, and the like described above) may be determined.

Meanwhile, the inventors of the present invention focused on that the above-described table referred to in association with the antenna port field according to Rel-15 includes one or more entries not used in scheduling of NCJT (multiple PDSCHs).

In the light of this, in yet other embodiments, when multiple TRPs are scheduled using a single PDCCH, the UE may support processing in which indication of the antenna port (indication of the antenna port field included in the DCI) is based on a new DMRS table that is not defined in Rel-15 (in other words, entries corresponding to the antenna port field are determined by referring to a new DMRS table).

The UE supporting the processing may determine whether to use the DMRS table according to Rel-15 or to use the new DMRS table, based on the TCI field included in the DCI. For example, when the TCI field indicates one TCI state, the UE may determine to use the DMRS table according to Rel-15, whereas when the TCI field indicates two or more TCI states, the UE may determine to use the new DMRS table.

Note that the processing may be applied only when multiple TRPs are scheduled using a single PDCCH.

The new DMRS table may be referred to as a table for multiple TRPs in single PDCCH-based design, a table for single PDCCH-based NCJT, a table only for NCJT, a DMRS table for Rel-16 or later versions, or the like.

The new DMRS table may be, for example, a DMRS table that does not include an entry specifying only one port. The entry specifying only one port may be, for example, an entry indicating that the number of DMRS CDM groups without data is 2 and the antenna port index of the PDSCH is 0. In other words, the new DMRS table may be configured to include only entries each specifying two or more ports.

The new DMRS table may be, for example, a DMRS table that does not include an entry specifying two or more ports in one CDM group. The entry specifying two or more ports in one CDM group may be, for example, an entry indicating that the number of DMRS CDM groups without data is 1 and the antenna port index of the PDSCH is 0, 1. In other words, the new DMRS table may be configured to include only entries each specifying two different CDM groups.

It is preferable that, when a certain DMRS type and a maximum length of a certain DMRS are assumed, the new DMRS table be configured such that the antenna port field in the DCI has the same field size as that in the case of Rel-15.

The new DMRS table may be obtained by adding a new entry to the existing table according to Rel-15. In this case, the size of the antenna port field in the DCI may be different from that in the case of Rel-15.

[Default QCL+New DMRS Table]

The UE may determine whether to use the DMRS table according to Rel-15 or to use the new DMRS table, based on the above-described default QCL, in addition to the TCI field or instead of the TCI field. For example, when the default QCL indicates one QCL, the UE may determine to use the DMRS table according to Rel-15, whereas when the default QCL indicates two or more QCLs, the UE may determine to use the above-described new DMRS table.

Note that the PDSCH with which the UE assume default QCL may be the PDSCH of a case in which the higher layer parameter "tCI-PresentInDCI" is not configured, or may be the PDSCH of a case in which the scheduling offset is smaller than the scheduling offset threshold as described in the embodiments above. In the latter case, the default QCL is assumed, regardless of whether or not the higher layer parameter "tCI-PresentInDCI" is configured.

The UE may determine the number of QCLs corresponding (or specified) to the default QCL, based on at least one of the following:

Search space set (for example, a type of search space) in which the DCI (scheduling DCI) for scheduling the PDSCH is received, CORESET (for example, an index of the CORESET, or a resource position of the CORESET) in which the DCI for scheduling the PDSCH is received, and Given field (for example, the TCI field) in the DCI for scheduling the PDSCH.

For example, when the UE receives the scheduling DCI in a first search space set (for example, a given common search space set), the UE may assume that the default QCL of the PDSCH scheduled using the DCI invariably corresponds to one QCL.

When the UE receives the scheduling DCI in a first search space set (for example, a UE-specific search space set), the UE may assume that the default QCL of the PDSCH scheduled using the DCI corresponds to two or more QCLs.

When the UE receives the scheduling DCI in a specific CORESET (for example, a CORESET zero (CORESET having an index of 0)), the UE may assume that the default QCL of the PDSCH scheduled using the DCI invariably corresponds to one QCL.

When the UE receives the scheduling DCI in a CORESET other than the specific CORESET, the UE may assume that the default QCL of the PDSCH scheduled using the DCI corresponds to two or more QCLs.

Note that, when multiple TRPs are scheduled using a single PDCCH (single DCI), the UE may assume that the higher layer parameter "tCI-PresentInDCI" is configured to be enabled. Even in a case of conforming to the default QCL, the UE may determine whether the scheduled PDSCH is based on a single TRP (the number of specified TCI states is one) or based on multiple TRPs (the number of specified TCI states is two or more), based on the TCI field in the DCI.

When the UE receives the DCI and determines that the scheduling offset is smaller than the scheduling offset threshold, the UE may receive the PDSCH in accordance with the default QCL. The UE may determine whether or not the new DMRS table is used for reception of the PDSCH, based on the TCI field of the DCI, and control decoding of the PDSCH.

When the higher layer parameter "tCI-PresentInDCI" is configured to be enabled, the UE may assume that the scheduled PDSCH is multiple PDSCHs. When the higher layer parameter "tCI-PresentInDCI" is not configured to be enabled, the UE may assume that the scheduled PDSCH is a single PDSCH (PDSCH from a single TRP). In other words, the UE may be semi-statically configured as to whether the PDSCH is based on a single TRP or based on multiple TRPs.

According to yet other embodiments described above, the UE can dynamically switch the TCI state/QCL assumption of a single TRP and multiple TRPs. The UE can appropriately separately use the DMRS tables, based on whether or not multiple TRPs are used.

Note that the table according to the present disclosure may be interpreted as correspondence relation based on a table. In other words, even if the UE does not store a table per se, the UE may derive corresponding entries based on the values of the antenna port field so as to satisfy correspondence relation of a table.

(Radio Communication System)

Hereinafter, a structure of a radio communication system according to one embodiment of the present disclosure will be described. In this radio communication system, any of the radio communication methods according to respective embodiments of the present disclosure described above may be used alone or may be used in combination for communication.

Figure 8:
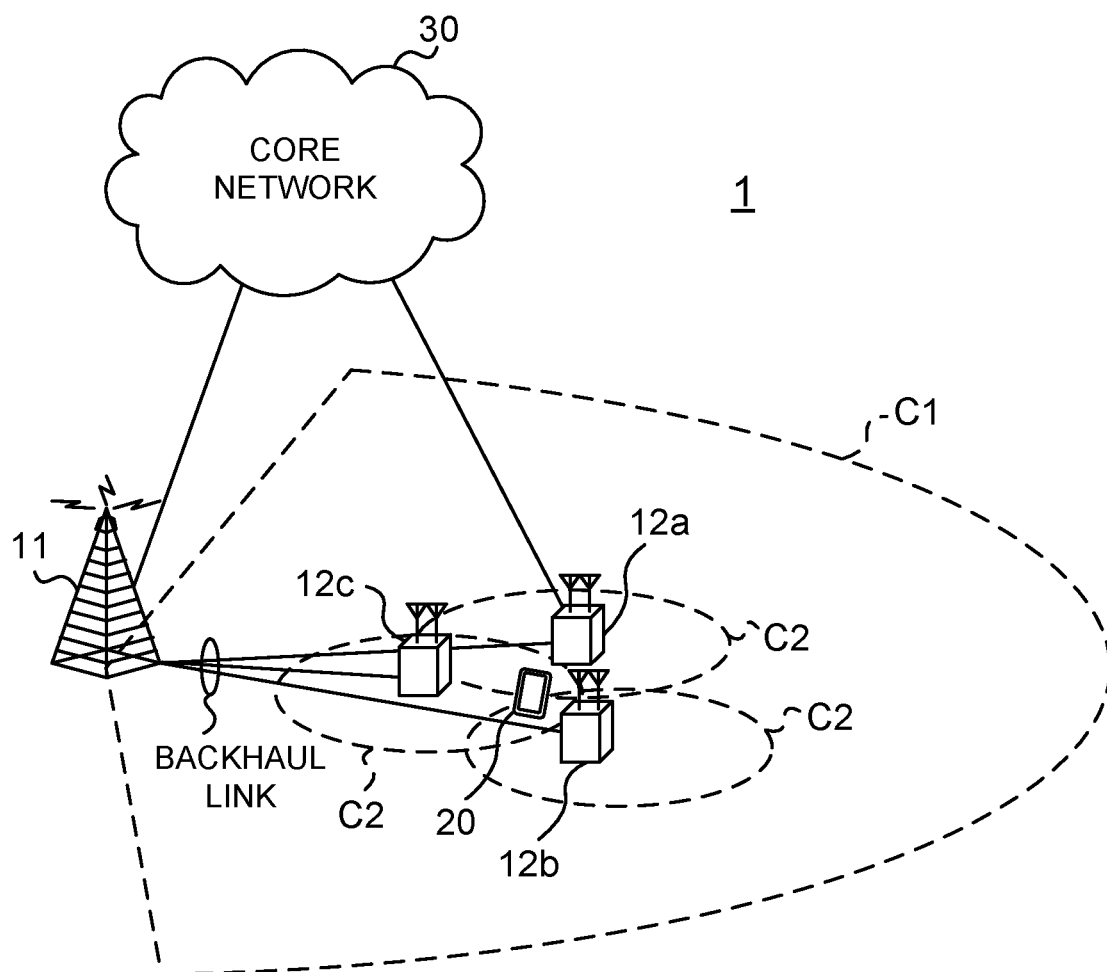
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using LTE (Long Term Evolution), 5G NR (5th generation mobile communication system New Radio) and so on the specifications of which have been drafted by 3GPP (Third Generation Partnership Project).

The radio communication system 1 may support dual connectivity (multi-RAT dual connectivity (MR-DC)) between a plurality of RATs (Radio Access Technologies). The MR-DC may include dual connectivity (EN-DC (E-UTRA-NR Dual Connectivity)) between LTE (E-UTRA (Evolved Universal Terrestrial Radio Access)) and NR, dual connectivity (NE-DC (NR-E-UTRA Dual Connectivity)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NN-DC (NR-NR Dual Connectivity)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (FR1 (Frequency Range 1)) and a second frequency band (FR2 (Frequency Range 2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the CPRI (Common Public Radio Interface), the X2 interface and so on) or a wireless connection (for example, an NR communication). For example, if an NR communication is used as a backhaul between the base stations 11 and 12, the base station 11 corresponding to a higher station may be referred to as an "IAB (Integrated Access Backhaul) donor," and the base station 12 corresponding to a relay station (relay) may be referred to as an "IAB node."

The base station 10 may be connected to a core network 30 through another base station 10 or directly. For example, the core network 30 may include at least one of EPC (Evolved Packet Core), 5GCN (5G Core Network), NGC (Next Generation Core), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), CP-OFDM (Cyclic Prefix OFDM), DFT-s-OFDM (Discrete Fourier Transform Spread OFDM), OFDMA (Orthogonal Frequency Division Multiple Access), SC-FDMA (Single Carrier Frequency Division Multiple Access), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (PDSCH (Physical Downlink Shared Channel), which is used by each user terminal 20 on a shared basis, a broadcast channel (PBCH (Physical Broadcast Channel)), a downlink control channel (PDCCH (Physical Downlink Control Channel)) and so on, may be used as downlink channels.

In the radio communication system 1, an uplink shared channel (PUSCH (Physical Uplink Shared Channel), which is used by each user terminal 20 on a shared basis, an uplink control channel (PUCCH (Physical Uplink Control Channel)), a random access channel (PRACH (Physical Random Access Channel)) and so on may be used as uplink channels.

User data, higher layer control information, SIBs (System Information Blocks) and so on are transmitted on the PDSCH. User data, higher layer control information and so on may be transmitted on the PUSCH. The MIBs (Master Information Blocks) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One SS may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Channel state information (CSI), transmission confirmation information (for example, which may be also referred to as HARQ-ACK (Hybrid Automatic Repeat reQuest ACKnowledgement), ACK/NACK, and so on), scheduling request (SR), and so on may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SSB (SS Block)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 9:
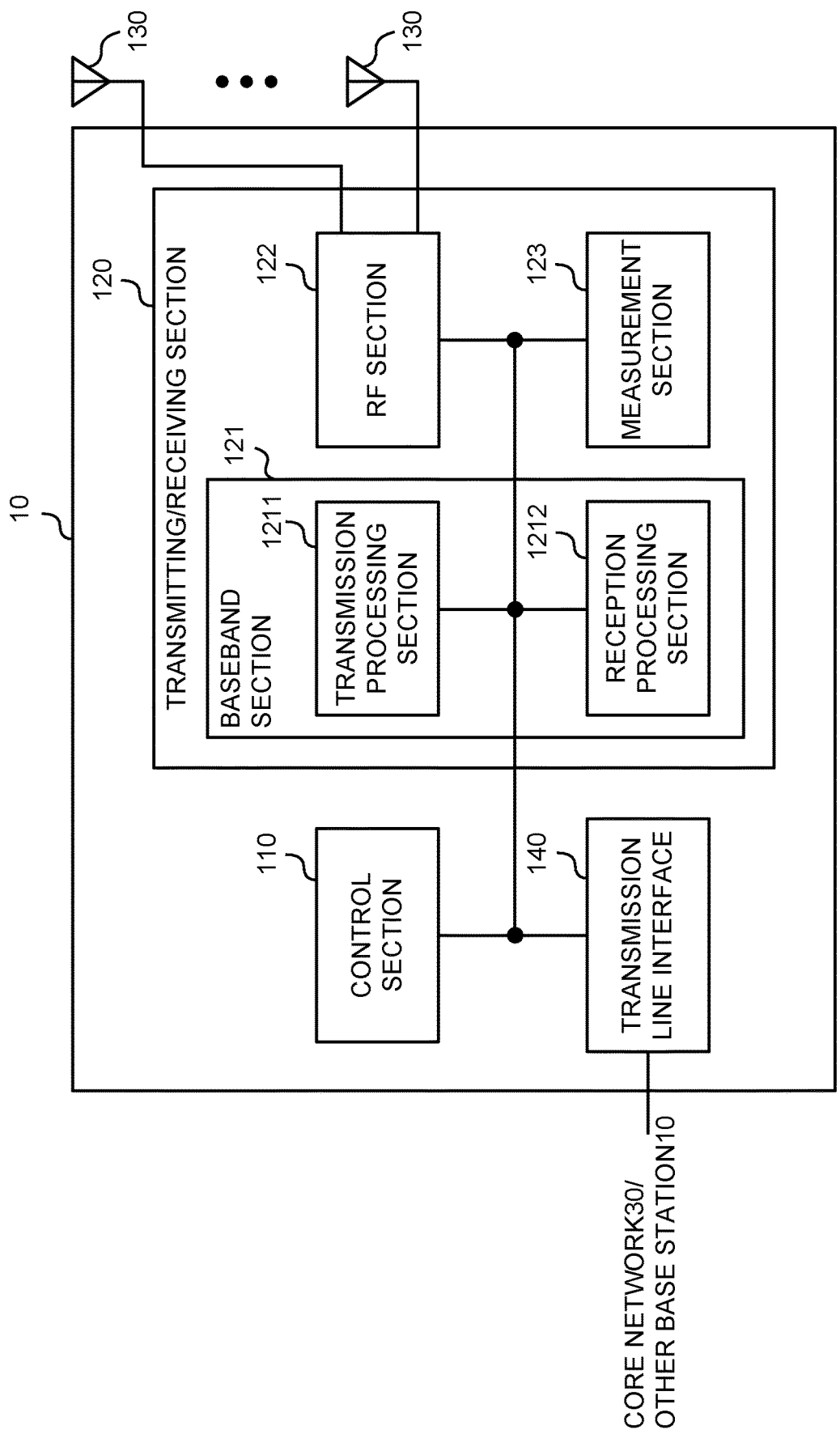
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, an RF (Radio Frequency) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the PDCP (Packet Data Convergence Protocol) layer, the processing of the RLC (Radio Link Control) layer (for example, RLC retransmission control), the processing of the MAC (Medium Access Control) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform RRM (Radio Resource Management) measurement, CSI (Channel State Information) measurement, and so on, based on the received signal. The measurement section 123 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit a plurality of PDSCHs to the user terminal 20 by using a plurality of panels. The transmitting/receiving sections 120 of a plurality of base stations 10 may transmit a plurality of PDSCHs to the user terminal 20.

The control section 110 may perform transmission processing so that, regarding each PDSCH, when a time offset between reception of corresponding downlink control information (DCI) and reception of the PDSCH is smaller than a given threshold, a DMRS port of a PDSCH (the PDSCH) of a serving cell is quasi co-located with a reference signal in a TCI state related to a QCL parameter used for QCL indication for a PDCCH having the lowest CORESET-ID of a given panel ID in the latest slot in which one or more CORESETs in an active BWP of the serving cell are configured for the user terminal 20.

Note that the given panel ID may be a minimum or maximum panel ID. The given panel ID may be a corresponding associated panel ID (for example, a panel ID of the base station 10 used for the PDSCH).

The above-described PDCCH having the lowest CORESET-ID may be a PDCCH for scheduling the PDSCH (may be limited). The above-described QCL parameter used for QCL indication for a PDCCH having the lowest CORESET-ID may be interpreted as a QCL parameter used for a PDCCH for scheduling the PDSCH.

(User Terminal)

Figure 10:
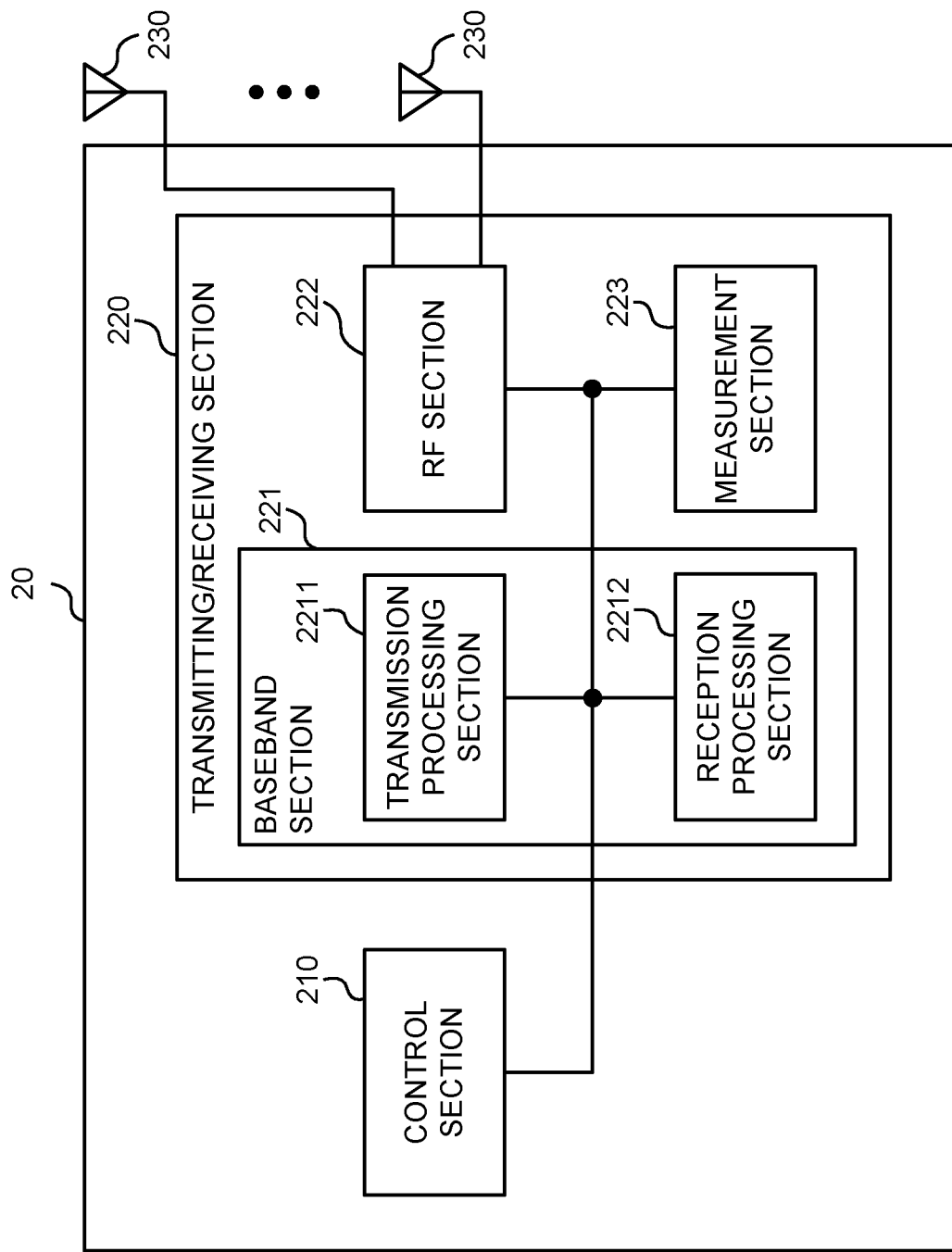
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the transmission line interface 240.

Note that the transmitting/receiving section 220 may receive a plurality of PDSCHs. The plurality of PDSCHs may be transmitted from TRPs different from each other (base stations 10 different from each other), or may be transmitted from panels different from each other.

The control section 210 may assume that, regarding each PDSCH, when a time offset between reception of corresponding downlink control information (DCI) and reception of the PDSCH is smaller than a given threshold, a DMRS port of a PDSCH (the PDSCH) of a serving cell is quasi co-located with a reference signal in a TCI state related to a QCL parameter used for QCL indication for a PDCCH having the lowest CORESET-ID of a given panel ID in the latest slot in which one or more CORESETs in an active BWP of the serving cell are configured for the user terminal 20. The control section 210 may perform reception processing of the PDSCH, based on the assumption.

Note that the given panel ID may be a minimum or maximum panel ID. The given panel ID may be a corresponding associated panel ID (for example, a panel ID of the base station 10 used for the PDSCH). When the given panel ID is a corresponding associated panel ID, it may be assumed that the plurality of PDSCHs are transmitted from TRPs different from each other.

The above-described PDCCH having the lowest CORESET-ID may be a PDCCH for scheduling the PDSCH (may be limited). The above-described QCL parameter used for QCL indication for a PDCCH having the lowest CORESET-ID may be interpreted as a QCL parameter used for a PDCCH for scheduling the PDSCH.

The transmitting/receiving section 220 may receive a downlink shared channel (Physical Downlink Shared Channel (PDSCH)), based on one piece of downlink control information (single PDCCH, single piece of DCI). The PDSCH may be multiple PDSCHs, or may be a single PDSCH.

The control section 210 may determine the number of default Quasi-Co-Locations (QCLs) to be applied to the PDSCH, based on the downlink control information.

The control section 210 may determine the number of default QCLs, based on a given field (for example, a TCI field) included in the downlink control information.

The control section 210 may determine the number of default QCLs, based on a search space set in which the downlink control information is received.

The control section 210 may determine the number of default QCLs, based on a control resource set (CORESET) in which the downlink control information is received.

In a case that the number of default QCLs is two or more, the control section 210 may control reception of the downlink shared channel, based on correspondence relation (for example, a new DMRS table) different from correspondence relation for a case in which the number of default QCLs is one.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
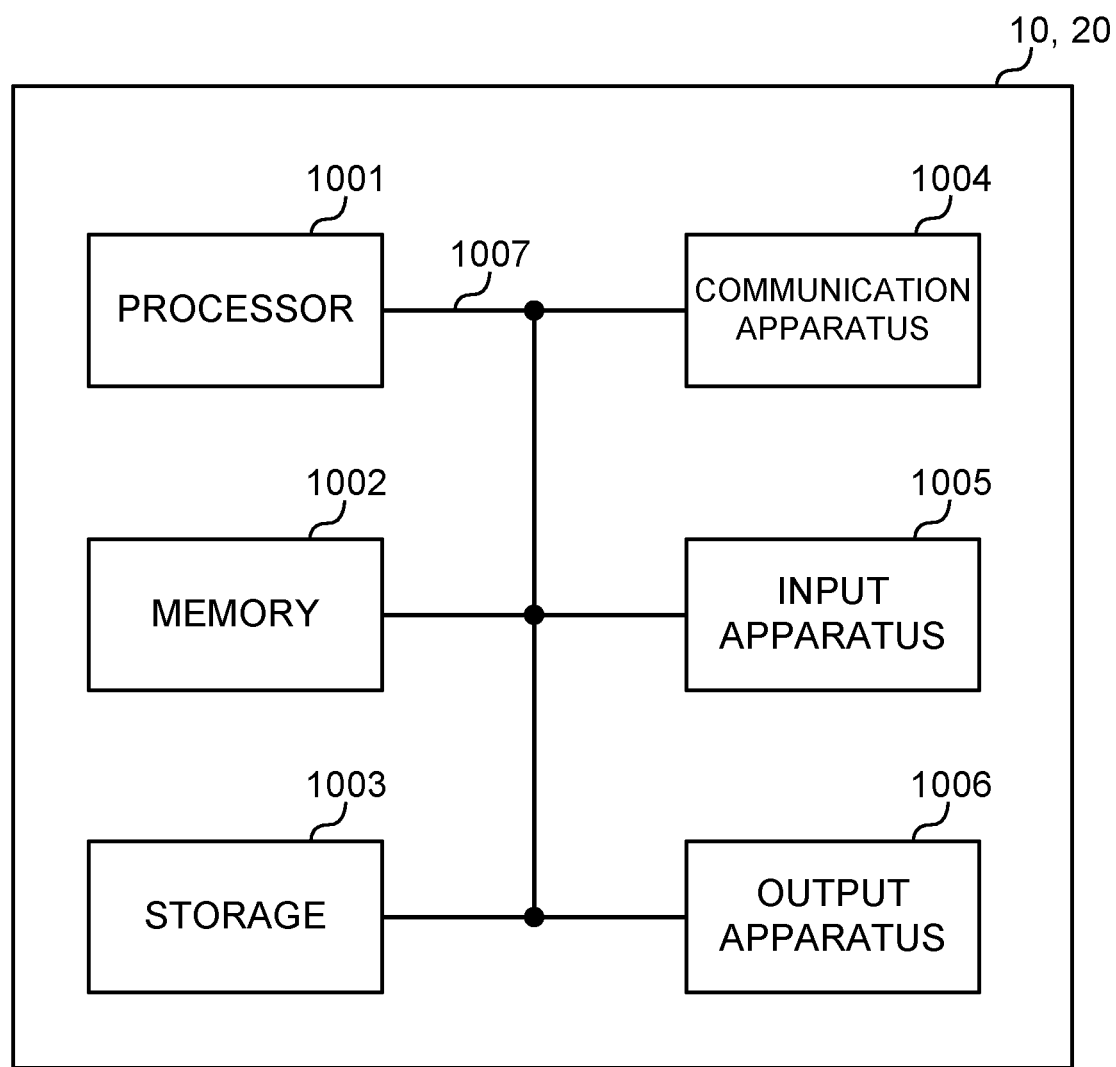
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "TCI state (Transmission Configuration Indication state)," a "spatial relation," a "spatial domain filter," a "transmission power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives one piece of down link control information (DCI) used for scheduling of a physical downlink shared channel (PDSCH); and
a processor that determines, based on a search space set or a control resource set (CORESET), a number of quasi co-location (QCL) assumption applied to the PDSCH, when a time offset between a reception of the DCI and a reception of the PDSCH is less than a threshold,
wherein if a transmission configuration indication (TCI) field included in the DCI indicates two TCI states, the processor determines to use a first demodulation reference signal (DMRS) table that includes an entry not included in a second DMRS table for the case where the TCI field indicates one TCI state.

2. A radio communication method for a terminal comprising:
receiving one piece of down link control information (DCI) used for scheduling of a physical downlink shared channel (PDSCH); and
determining, based on a search space set or a control resource set (CORESET), a number of quasi co-location (QCL) assumption applied to the PDSCH, when a time offset between a reception of the DCI and a reception of the PDSCH is less than a threshold,
wherein if a transmission configuration indication (TCI) field included in the DCI indicates two TCI states, a first demodulation reference signal (DMRS) table is used, the first DMRS table including an entry not included in a second DMRS table for the case where the TCI field indicates one TCI state.

3. A system comprising a terminal and a base station, wherein
the terminal comprises:
a receiver that receives one piece of down link control information (DCI) used for scheduling of a physical downlink shared channel (PDSCH); and
a processor that determines, based on a search space set or a control resource set (CORESET), a number of quasi co-location (QCL) assumption applied to the PDSCH, when a time offset between a reception of the DCI and a reception of the PDSCH is less than a threshold, wherein if a transmission configuration indication (TCI) field included in the DCI indicates two TCI states, the processor determines to use a first demodulation reference signal (DMRS) table that includes an entry not included in a second DMRS table for the case where the TCI field indicates one TCI state, and the base station comprises:
a transmitter that transmits the DCI.

* * * * *